United States Patent [19]
Kato et al.

[11] Patent Number: 5,338,173
[45] Date of Patent: Aug. 16, 1994

[54] PARISON CONTROLLER OF BLOW MOLDING APPARATUS

[75] Inventors: Takaaki Kato; Kiyomi Suzuki; Shigeharu Hagiwara; Hiroaki Takanashi, all of Yokohama, Japan

[73] Assignee: The Japan Steel Works, Ltd., Tokyo, Japan

[21] Appl. No.: 34,533

[22] Filed: Mar. 19, 1993

[51] Int. Cl.$^5$ ............................................. B29C 47/22
[52] U.S. Cl. ................................. 425/150; 425/381; 425/466; 425/532
[58] Field of Search ............... 425/532, 466, 381, 150; 264/540-542

[56] References Cited

U.S. PATENT DOCUMENTS

| | | | |
|---|---|---|---|
| 2,632,202 | 3/1953 | Haines | 264/515 |
| 3,023,461 | 3/1962 | Sherman | 425/532 X |
| 3,909,183 | 9/1975 | Hsu | 425/466 |
| 4,159,293 | 6/1979 | Fukase et al. | 425/532 X |
| 4,305,902 | 12/1981 | Uhlig | 264/540 X |
| 4,394,116 | 7/1983 | Kuenzig et al. | 425/381 X |
| 4,907,957 | 3/1990 | Nakagawa et al. | 264/541 X |
| 4,971,542 | 11/1990 | Langlois et al. | 264/541 X |

FOREIGN PATENT DOCUMENTS

| | | |
|---|---|---|
| 1629340 | 4/1971 | Fed. Rep. of Germany . |
| 60-21042 | 5/1985 | Japan . |
| 1208501 | 10/1970 | United Kingdom ............. 425/532 |

*Primary Examiner*—Richard L. Chiesa
*Attorney, Agent, or Firm*—Brooks Haidt Haffner & Delahunty

[57] ABSTRACT

A parison controller of blow molding apparatus for varying the thickness of a parison extruded from an ejection orifice by displacing in an up and down direction a core provided at the ejection orifice of the die of a cross head. The parison controller of blow molding apparatus has a motor through which the core is displaced. It further includes: a rod connected to the core provided at the cross head; a female threaded portion formed on the upper portion of the rod; a rotating rod having a male threaded portion threaded into said female threaded portion; a reduction gear connected to said rotating rod through a thrust bearing; and the motor connected to the reduction gear. Since the core forming the ejection orifice for ejecting the parison is displaced through a motor, a reduction in the size thereof and saving of resources may be achieved and a high quality parison may be obtained as compared with a conventional parison controller which uses a hydraulic system.

6 Claims, 3 Drawing Sheets

PARISON CONTROLLER OF BLOW MOLDING APPARATUS

BACKGROUND OF THE INVENTION

1. Field of the Invention

The present invention relates to a parison controller of blow molding apparatus and, more particularly, relates to a novel improvement thereof in which a core provided at an ejection orifice for ejecting the parison is moved by a motor, to achieve reduction in size of the apparatus as a whole and saving of resources and to obtain a high quality parison.

2. Description of the related art

Various types have conventionally been used as a parison controller in such a blow molding apparatus, and typical ones include a generally employed construction as shown in FIGS. 1 and 2, which will now be described.

Referring specifically to FIG. 1, what is denoted by numeral 1 is a cross head to which a molten resin 4 is supplied from an extruder 2, and formed on a die 3 provided at the lower portion of the cross head 1 is an ejection orifice 5 for performing the ejection of the molten resin 4.

The ejection orifice 5 is formed in the shape of a ring by a taper-like core 6 which is operably provided at the center of the die 3. The core 6 has a taper portion 6a and a linear portion 6b integrally formed thereon as shown in FIG. 2, and the thickness of a parison 12 to be extruded may be varied by displacing the core 6 in the direction of arrow "A" to change at will the distance between an outer surface 6aA of the taper portion 6a and an inner wall 5a of the ejection orifice 5.

The core 6 is connected to a rod 7 provided through a top portion 1a of the cross head 1, the rod 7 being connected to a piston (not shown) of a servo actuator 9 which is provided above the cross head 1 by means of support pillars 8.

A hydraulic unit 10 and a control unit 11 are connected to the servo actuator 9 and a memory (not shown) in the control unit 11 contains a program for program-controlling the servo actuator 9.

The servo actuator 9 is operated in accordance with the program in the control unit 11 to control up and down movement of the core 6, so as to continuously effect control such that the thickness of the parison 12 to be ejected from the ejection orifice 5 may be changed at will to a thickness which is required corresponding to the shape of a formed product.

Since the conventional parison controller in a blow molding apparatus is constructed as described, the following problems occur.

That is, since the displacement of the core is effected by hydraulic control, the parison may be contaminated for example when a leakage of oil has occurred, the contamination of the parison being a fatal defect in forming. Further, hydraulic control is inefficient and cannot control the position of the core with precision, whereby it is difficult to achieve a highly accurate control of the thickness of a parison. Furthermore, cost of a hydraulic unit is high and it requires a large space, and the size of the motor of the hydraulic unit becomes large where it is impossible to achieve saving of energy.

SUMMARY OF THE INVENTION

To solve the above problems, it is an object of the present invention to provide a parison controller of blow molding apparatus, in which a core for forming an ejection orifice for ejecting a parison is displaced by a motor to achieve a reduction in size thereof and saving of resources and to obtain a high quality parison.

A parison controller of blow molding apparatus is provided in accordance with the present invention, said parison controller of blow molding apparatus varying the thickness of a parison extruded from an ejection orifice by displacing in an up and down direction a core provided at the ejection orifice of the die of a cross head, wherein said core is adapted to be moved by a motor.

In particular, the controller includes: a rod connected to the core provided at the cross head; a female threaded portion formed on the upper portion of the rod; a rotating rod having a male threaded portion threaded into the female threaded portion; a reduction gear connected to the rotating rod through a thrust bearing; and a motor connected to the reduction gear.

More particularly, said motor is of a variable speed type and is adapted to be program-controlled through a control unit.

In a parison controller of blow molding apparatus according to the present invention, since the core provided at the die of a cross head is moved up and down by a motor which is program-controlled, the rotation of the motor itself may be controlled with high precision to perform the displacement of the core with high precision, whereby the thickness of the parison may be controlled at will.

DESCRIPTION OF THE PREFERRED EMBODIMENT

A preferred embodiment of the parison controller of blow molding apparatus according to the present invention will now be described with reference to the drawings.

It should be noted that, in the following description, like numerals are used to denote like or identical portions as in the foregoing conventional example.

Figure 3:
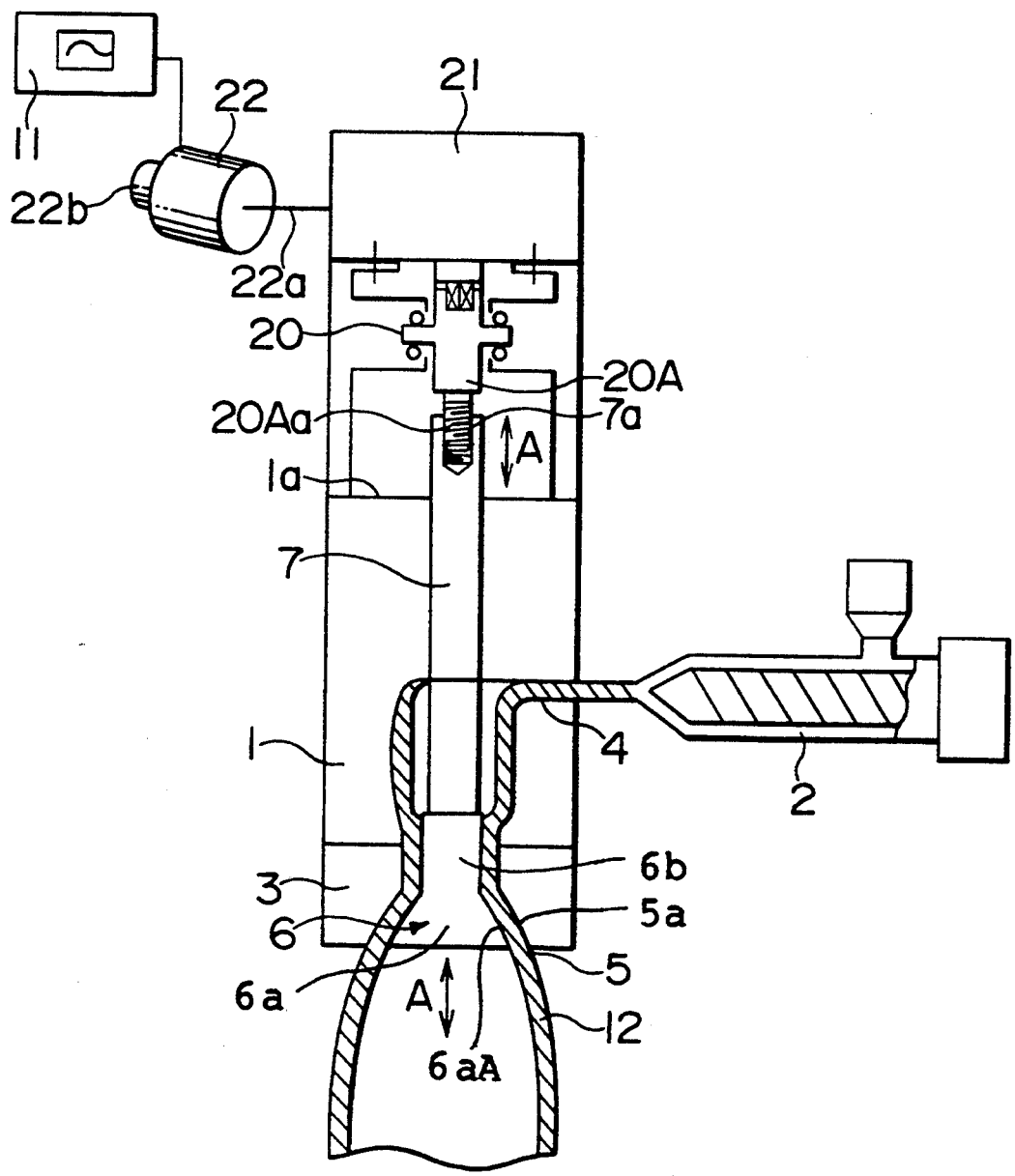
FIG.3 shows the construction of a parison controller of blow molding apparatus according to the present invention.
Figure 4:
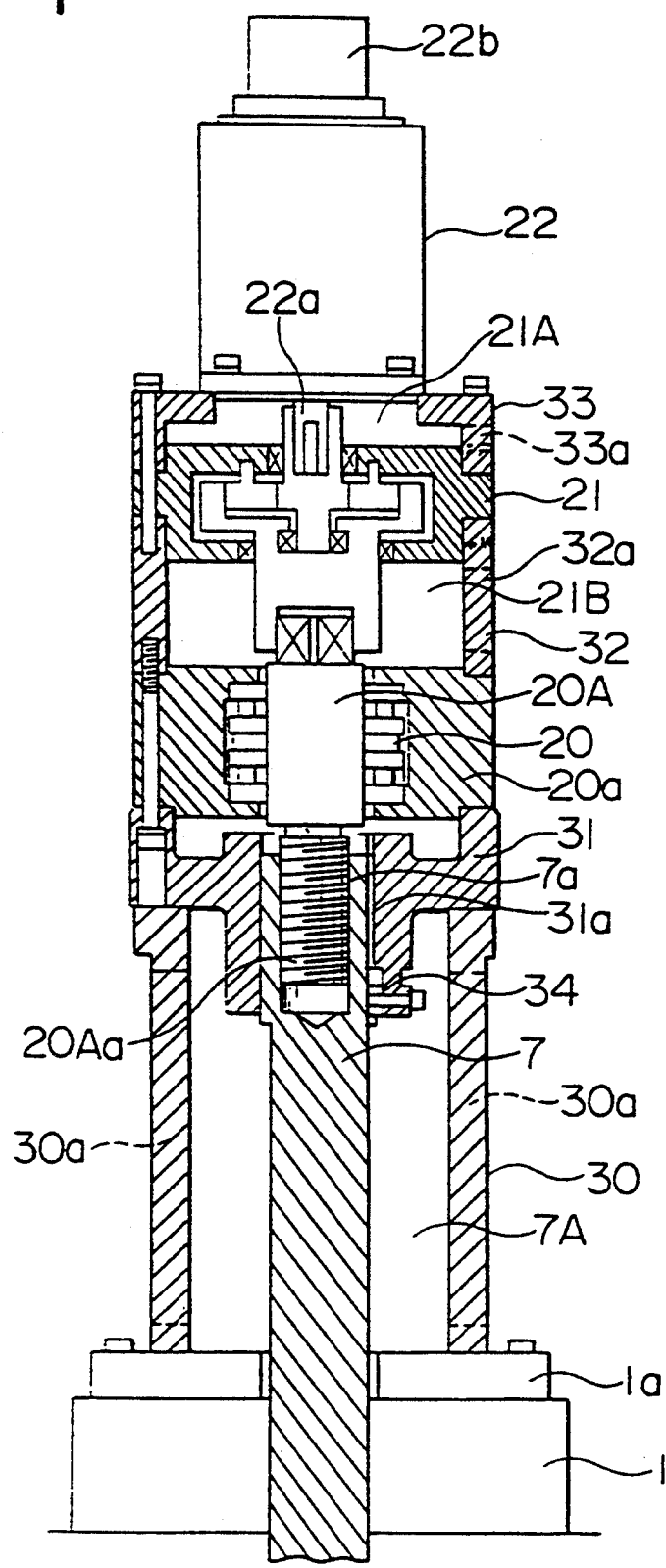
FIG.4 is an enlarged section showing in detail certain portions of FIG.3.

FIGS.3 and 4 show the construction of a parison controller of blow molding apparatus according to the present invention.

Referring to FIG.3, what is denoted by numeral 1 is a cross head to which a molten resin 4 is supplied from an extruder 2, and a ring-like ejection orifice 5 for performing the ejection of the molten resin 4 is formed in a die 3 which is provided at the lower portion of the cross head 1.

Figure 1:
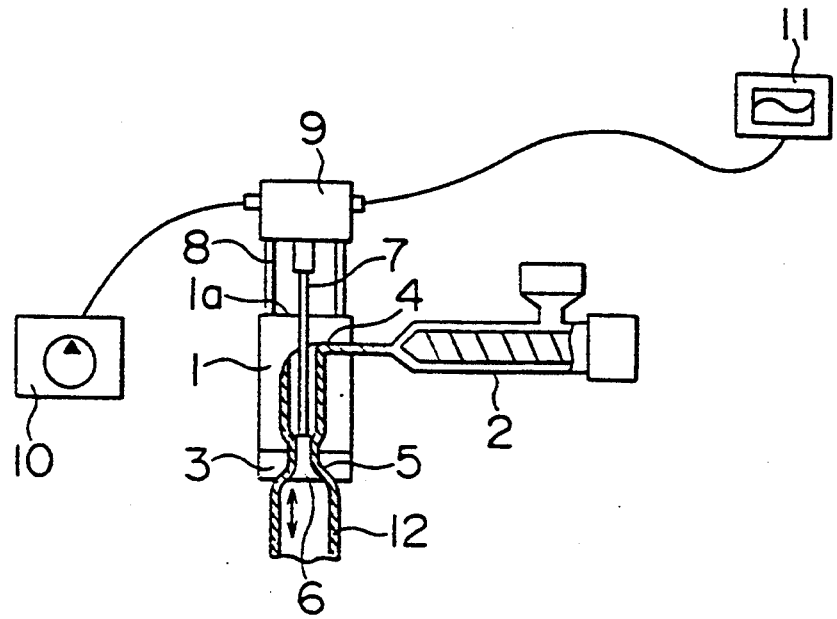
FIG.1 shows the construction of a conventional parison controller of blow molding apparatus.
Figure 2:
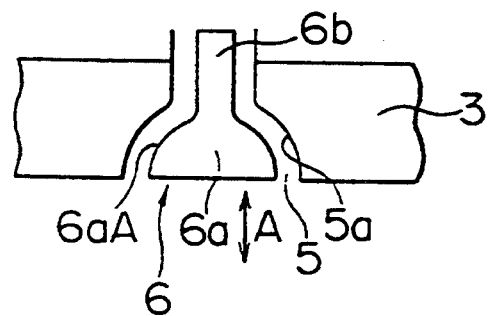
FIG.2 is an enlarged section showing certain portions of FIG.1.

The ejection orifice 5 is formed in the shape of a ring by a core 6 which is operably provided at the center of the die 3. The core 6 has a taper portion 6a and a linear portion 6b integrally formed thereon as shown in FIG.2, and the thickness of a parison 12 to be extruded may be varied by moving the core 6 in the direction of arrow "A" to change at will the distance between an outer surface 6aA of the taper portion 6a and an inner wall 5a of the ejection orifice 5. It should be noted that the above described construction is identical to that in the conventional example.

The core 6 is connected to a rod 7 which is provided through a top portion 1a of the cross head 1 in a manner capable of being moved up and down only in the direction indicated by arrow "A", and a female threaded portion 7a is formed at the upper portion of the rod 7.

Threaded into the female threaded portion 7a in a manner capable of moving forward and backward therein is a male threaded portion 20Aa of a rotating rod 20A which is connected to a reduction gear 21 by way of a known thrust bearing 20 provided to receive the pressure from the resin. A rotating shaft 22a of a motor 22 is connected to the reduction gear 21. The motor 22 is constructed as a variable speed type such as an AC servo motor having a rotation detector 22b such as a rotary encoder, and connected thereto is a control unit 11 having a memory (not shown) for storing a program.

FIG.4 shows more particularly the construction as shown in the above described FIG.3 of rotation detector 22b, servo motor 22, reduction gear 21, thrust bearing 20, rod 7 and the cross head 1.

Specifically, a rod guide 31 is placed above a retaining plate 1a on the cross head 1 by way of a first spacer frame 30 which has first vent holes 30a, and a thrust bearing box 20a having a thrust bearing 20 is provided on the rod guide 31. In addition, the male threaded portion 20Aa of the rotating rod 20A of the thrust bearing 20 is threaded into and connected to the female threaded portion 7a of the rod 7.

A second spacer frame 32 having a second vent hole 32a is provided on the thrust bearing box 20a, and provided on the second spacer frame 32 is a known reduction gear 21 of which a description of the construction will be omitted. Furthermore, the servo motor 22 having the rotation detector 22b is placed above the reduction gear 21 by way of a third spacer frame 33 having a third vent hole 33a.

Further, the rod 7 and the rod guide 31 are connected to each other through a key portion 34 which serves as a rotation stopper for the rod 7, so that the rod 7 is movable only in the up and down direction thereof and is constructed not to be rotated. The upper portion 7a of the rod 7 is guided in up and down movement within a guide hole 31a of the rod guide 31. It should be noted that each of the spacer frames 30, 32, 33 is formed as a frame or pillar and, in either case, holes corresponding to the vent holes 30a, 32a, 33a are formed therein. The circumferential surrounding area 7A of the rod 7 and the similar respective circumferential areas 21A and 21B respectively adjacent to the upper portion and the lower portion of the reduction gear 21 as described are provided by the radial spacing of the respective frames therefrom and are arranged so that they are in communication with the outside air through the vent holes 30a, 32a, 33a, respectively, so as to dissipate internally confined heat, thereby preventing transmission of heat to the motor 22 from molten resin to prevent heat-caused damage to the motor 22.

A description will now be given with respect to the case where the parison controller of blow molding apparatus according to the present invention is operated in the above described construction.

First, when the motor 22 is rotated by the control unit 11 containing a previously set program so that the rotation of the motor 22 causes the male threaded portion 20Aa to be rotated through the reduction gear 21, the thrust bearing 20 and the rotating rod 20A, only the rod 7 is displaced in the direction of the arrow "A" by the female threaded portion 7a whereby the rod 7 is positioned with a high precision in the axial direction thereof. Thus, the ring-like gap at the ejection orifice 5 due to movement of the core 6 in the direction of the arrow "A" may be changed at will.

Accordingly, by desirably setting the program of the control unit 11, the position in the up and down direction of the rod 7 is set and at the same time the up and down position of the core 6 is set. Thereby the required interval of the ejection orifice 5 may be varied to continuously change at will the thickness of the parison 12.

While the servo motor 22 in the above described embodiment controls the displacement of the rod 7 by means of the rotation detector 22b, if, for example, a step motor is used instead of the servo motor, it is possible to control the displacement of the rod only by a feed instruction without using the rotation detector 22b. Further, in such a case, though the size of the step motor becomes large as the step motor uses a power 5~6 times usually that of a servo motor for eliminating loss of synchronism of the step motor, it is possible to control the position of the core 6 with a high precision which cannot be obtained by the conventional hydraulic system.

Since the parison controller of blow molding apparatus according to the present invention is Constructed as described, it provides the following advantages.

Specifically, since the core for varying the width of the ejection orifice formed at the die is moved up and down by a program-controlled motor, contamination of the parison due to leakage of oil does not occur and a clean formed product may be easily obtained as compared with the conventional hydraulic construction.

Further, as compared with to the conventional hydraulic construction, costs may be greatly reduced and the required space becomes much smaller.

Furthermore, when for example a parison having a diameter of 100 mm is to be formed, a force of about 3 tons is applied to the rod through the core and a motor of 0.7 KW is required to drive the rod against such force. While the transmission efficiency of the motive force is lower and loss thereof becomes larger for a hydraulic servo, higher precision and saving of energy may be achieved by a mechanism which uses a motor.

Moreover, since detection of position is performed at a position detector directly connected to the motor, a detector for feedback becomes unnecessary whereby the construction may be simplified to achieve a reduction in size.

What is claimed is:

1. A parison controller for a blow molding apparatus for varying the uniform thickness of a tubular parison extruded from an injection orifice of a die mounted on a cross head of said apparatus, said controller providing controlled reversible vertical displacement movement of a core within said ejection orifice, said controller comprising a rod attached to and projecting upwardly from said core; a rod guide receiving said upwardly projecting core rod for guided vertical movement; a thrust bearing above said rod guide and having a rotatable thrust bearing rod extending vertically therethrough, said thrust bearing rod having an upper end an a lower end; a vertically adjustable screw thread connection between said lower end of said thrust bearing rod and said upwardly projecting core rod to provide adjustable vertical movement of said core rod responsive to adjustment rotation of said thrust bearing rod; a reduction gear connected to said upper end of said thrust bearing rod for imparting said adjustment rotation thereto; and a servo motor having reversible rotation and connected in driving relation to said reduction gear for providing said adjustment rotation thereof; said motor having means for detecting its said reversible rotation, and a motor control unit responsive to said motor rotation detecting means for adjustably driving said motor in either direction to provide said controlled reversible vertical displacement movement of said core.

2. A parison controller according to claim 1, wherein said servo motor is a variable speed electric motor; said motor rotation detecting means is a rotary encoder, and said control unit has a memory for storing a program for determining said vertical displacement movement of said core.

3. A parison controller according to claim 1, wherein said core rod, said thrust bearing and said reduction gear are vertically arranged, and said controller further comprises a spacer frame mounted on said blow molding apparatus cross head and extending circumferentially around said upwardly projecting core rod in radially spaced relation thereto; and vent hole means through said spacer frame for dissipating heat from around said core rod.

4. A parison controller according to claim 3, wherein said reduction gear has an upper portion and a lower portion, said lower portion of said reduction gear being connected to said upper end of said thrust bearing rod; and said controller further comprises a second spacer frame mounted on and between said thrust bearing and said reduction gear and extending circumferentially around said connected reduction gear lower portion and thrust bearing rod upper end in radially spaced relation thereto; and second vent hole means through said second spacer frame for dissipating heat from around said connected reduction gear lower portion and thrust bearing rod upper end.

5. A parison controller according to claim 4, which further comprises a third spacer frame mounted on said reduction gear, said servo motor being mounted on said third spacer frame and being connected in driving relation to said upper portion of said reduction gear, said third spacer frame extending circumferentially around said upper portion of said reduction gear in radially spaced relation thereto; and third vent hole means through said third spacer frame for dissipating heat from around said upper portion of said reduction gear.

6. A parison controller for a blow molding apparatus for varying the thickness of a parison extruded from an ejection orifice by displacing in an up and down direction a core provided at said ejection orifice of a die of a cross head, comprising a vertical rod connected to said core adjacent to said cross head; a first spacer frame mounted on said cross head; a circumferential cavity being formed by said first spacer frame around said rod; a first vent hole provided in said first spacer frame to said cavity; a female threaded portion being formed on the upper portion of said rod; a rod guide mounted on said first spacer frame receiving said rod and having a key portion for stopping rotation of said rod; a rotating rod threaded into said female threaded portion of said vertical rod; a reduction gear connected to said rotating rod through a thrust bearing having a thrust bearing box which is mounted on said rod guide; a second spacer frame mounted between said thrust bearing box and said reduction gear; a lower circumferential cavity being formed by said second spacer frame around the connection between said reduction gear and said vertical rod; a second vent hole provided in said second spacer frame to said lower cavity; a third spacer frame mounted on said reduction gear; a servo motor mounted on said third spacer frame, said motor having a rotating shaft connected to said reduction gear in driving relation; an upper circumferential cavity being formed by said third spacer frame around said rotating shaft; a third vent hole provided in said third spacer frame to said upper cavity; and a rotation detector mounted on said servo motor for detecting rotation of its said rotating shaft.

* * * * *